Aug. 3, 1965   A. B. BROERMAN   3,198,018
ELECTRICALLY ACTUATED SAMPLING VALVE
Filed Dec. 28, 1961   3 Sheets-Sheet 1

INVENTOR.
A. B. BROERMAN
BY Young & Quigg
ATTORNEYS

Aug. 3, 1965    A. B. BROERMAN    3,198,018
ELECTRICALLY ACTUATED SAMPLING VALVE
Filed Dec. 28, 1961    3 Sheets-Sheet 3

INVENTOR.
A.B. BROERMAN
BY Young & Quigg
ATTORNEYS

United States Patent Office 3,198,018
Patented Aug. 3, 1965

3,198,018
ELECTRICALLY ACTUATED SAMPLING VALVE
Arthur B. Broerman, Bartlesville, Okla., assignor to Phillips Petroleum Company, a corporation of Delaware
Filed Dec. 28, 1961, Ser. No. 162,844
4 Claims. (Cl. 73—422)

This invention relates to an electrically actuated control mechanism. This invention relates to a multi-port, diaphragm-sealed, valve mechanism. In another aspect it relates to an electrically actuated, sampling valve for a chromatographic analyzer having a solenoid element for higher speed sealing of the diaphragm.

Gas chromatography is a known method of analyzing fluid samples by preferential sorption and desorption. The desirability of using chromatography for such specific uses as fractionation (multi-stage distillation) control has been recognized for some time. Certain features of process chromatography, such as specific measurement, high sensitivity, and simplicity of operation make this type of analyzer very attractive for use in automatic process control. There are, however, some apparently inherent features of chromatography which have appeared to be obstacles in adapting chromatography to wide-spread use in process control.

Under certain circumstances, it is necessary to be able to inject a sample stream into a carrier gas stream with great rapidity. To do this, dwell time must be of relatively short duration in order to limit carefully the volume of sample being injected. Air-actuated sampling valves are characterized by a relatively long dwell time that is simply not acceptable in the type of service under discussion. A solenoid-actuated sampling, or switching, valve is found to be characterized by a relatively high speed of operation that is most desirable in obtaining small sample slug volumes.

Generally, a double-acting, fast response, solenoid-actuated control mechanism should find application in addition to the sampling valve for gas chromatography.

In the instances where fixed volume sample loops form an integral part of the sampling valve, as in my copending application, Serial No. 96,773, filed March 20, 1961, the "plumbing" requirements can be simplified where air service is not conveniently available. Thus, a pneumatically-operated pilot valve can be replaced and the air lines to the sampling valve can be dispensed with. In their stead, only a 110 volt A.C. power is required to operate the novel solenoid mechanism. Moreover, this power requirement is often already available for the operation of various automatic switches on the chromatographic analyzer.

According to the present invention, there is provided a multi-port, diaphragm-sealed sampling valve, of which an actuating solenoid forms an integral part. Novelly, the stator of the assembly is normally biased by spring means to transmit pressure to a plurality of pistons while they are in the non-excited position. This first plurality of pistons (usually three in number) seal the adjacent areas of the sealing diaphragm over certain of the valve ports, thus defining one path of flow for carrier and sample gas. Concurrently, another spring biases a second plurality of shorter pistons open, forcing the armature inward so that these pistons are not in sealing contact with the diaphragm, and fluid flow is permitted between the adjacent valve ports under their areas of the diaphragm.

When the solenoid is excited, as directed by a programmer, the armature moves outward a predetermined distance exerting pressure through a rocking washer on the second plurality of shorter pistons, thus sealing the adjacent areas of the diaphragm. At this time, all the passages are closed, achieving the desired "break before make" type of switching. The permitted movement of the armature has reduced the total magnetic gap by about one half. With magnetic flux still being present, the stator moves oppositely to close the remaining gap by overcoming and depressing a first spring biasing means. Thus, the stator no longer pressures the first plurality of longer pistons upward, permitting the second spring to retract said longer pistons from contact with the diaphragm, thus establishing an alternate path of flow through the sampling valve. This valve is characterized by quick response in the switching between opening and closing of the ports, which speed is desired in many applications, upon a signal from the programmer.

Accordingly, it is an object of this invention to provide a double-acting, solenoid-actuated control mechanism.

It is, therefore, an object of this invention to provide a sampling valve for use in a chromatographic system, whereby high speed of diaphragm sealing can be achieved.

It is another object to provide an electrically-actuated diaphragm sealing valve for supplying sample slugs to the sorption columns of a chromatographic analyzer.

It is another object to provide a sampling valve capable of periodically injecting a sample stream into a carrier gas stream while having a dwell time of short duration in order to carefully limit the volume of sample being injected.

Other objects, advantages, and alterations of this invention will become aparent to those skilled in the art without departing from the scope and spirit of this invention, and it should be understood that the latter is not necessarily limited to the aforementioned discussion. Now follows a detailed description, set forth in conjunction with the accompanying drawing, in which:

FIGURES 3 and 3a are an exploded perspective view of the components of the diaphragm valve of this invention arranged in the order of their assembly;

Figure 1:
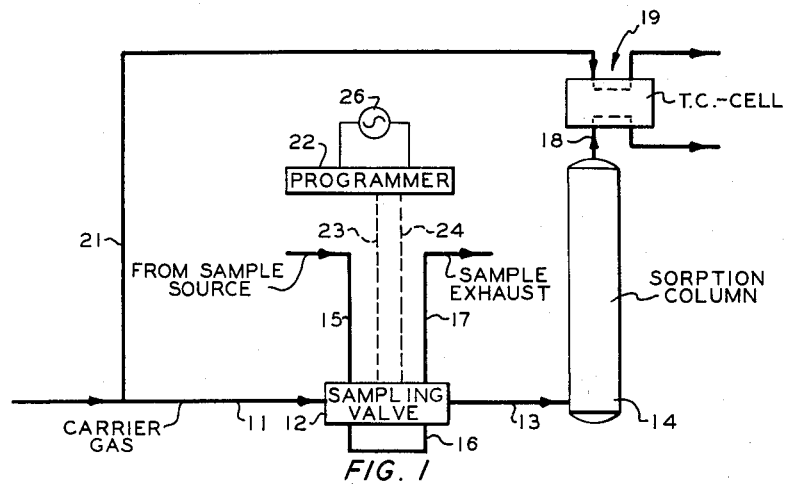
FIGURE 1 is a schematic flow diagram of a chromatographic analyzer system embodying the sampling valve of this invention.

Reference is now made to the drawing in detail, wherein like parts have been designated by like reference numerals, and to FIGURE 1, in particular, wherein a carrier gas, such as helium or hydrogen, passes continuously via conduit 11 to an electrically-actuated, diaphragm-sealed sampling valve 12. The carrier gas passes from the sampling valve via conduit 13 to sorption column 14. A gaseous sample from a process stream (not shown), introduced to sampling valve 12 via conduit 15 is being circulated through sample loop 16 and vented therefrom via a sample exhaust conduit 17.

Periodically, the sample slug in the sample loop is passed along to column 14 by the loop being switched into the carrier gas stream. In the column, the constituents of the sample to be identified and measured, are absorbed and adsorbed, depending upon the nature of the contact material, and then are selectively desorbed by a continuing flow of carrier gas therethrough.

The effluent from the column passes via conduit 18 thru an analyzer, generally indicated as thermal conductivity assembly 19. The output signal from the detector 19 is passed to a recording instrument (not shown), which can be a conventional strip chart recorder. A stream of carrier gas is passed via conduit 21 directly to the reference cell of detector 19, so as to balance out the effect of the carrier gas in the column 14 effluent. The sample gas to be analyzed generally enters the system continuously thru conduit 15. It is exhausted thru conduit 17, even while a slug thereof is being injected into the carrier gas stream for analysis. The solenoid switch component (not shown) of valve 12 is actuated by a programmer 22, which can be operated by a time cycle, or other means. The programmer connects with valve 12 via electrical leads 23 and 24. The former also being connected to 110 volt A.C. source 26.

When the solenoid-actuated assembly is changed from the first described position, carrier gas now passes through the sample loop, collecting the sample trapped therein, and carrying the same to sorption column 14, via conduit 13. Thus, each time the solenoid-actuated assembly is switched to the alternate position of operation, a measured sample is passed via conduit 13 to column 14 for sorption and desorption therein.

Figure 2:
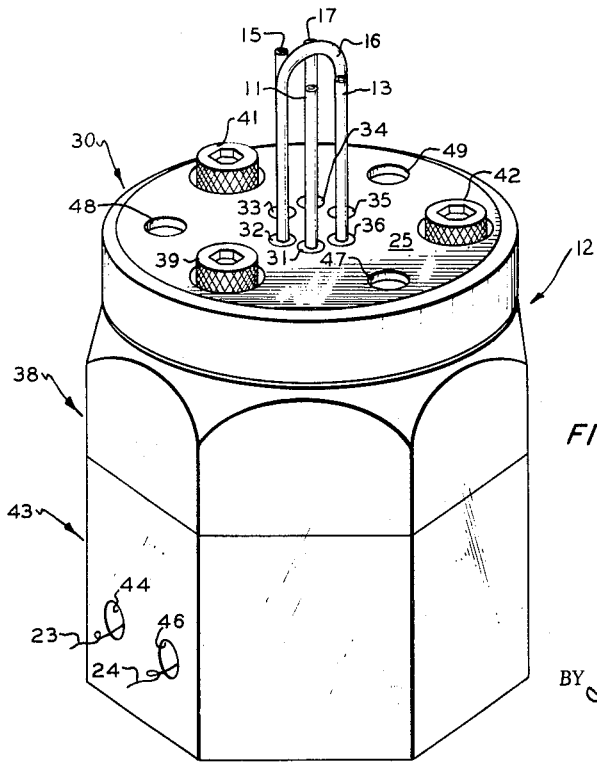
FIGURE 2 is a perspective view of an assembled electrically actuated, diaphragm-sealed valve of this invention.

In FIGURE 2, there is shown a perspective view of the assembled, solenoid-actuated, flexible diaphragm sampling valve of this invention, generally designated 12. Sampling valve 12 comprises an upper body 30 provided with four tubings, 11, 15, 17 and 13 in upper face 25 which are press fitted and silver braze sealed into four spaced, vertical passages 31, 33, 34 and 36, respectively, which communicate with the lower surface (not shown) of upper block 30. External sample loop 16 communicates between similar vertical passages 32 and 35. Adjacent to upper block 30 is intermediate block 38 provided with a plurality of cylindrical passages (not shown) communicating between the upper and lower faces thereof. Upper block 30 is secured to block 38 by Allen headed, cap screws 39, 41 and 42.

Disposed adjacent to body 38 is lower block 43 provided with two passages, 44 and 46, to permit leads 23 and 24 to connect with programmer 22 of FIGURE 1. Lower body 43 is secured to intermediate body 38 from the underside thereof by cap screws (not shown). Passages 47, 48 and 49 in upper block 30 are provided for alignment purposes.

Figure 3:
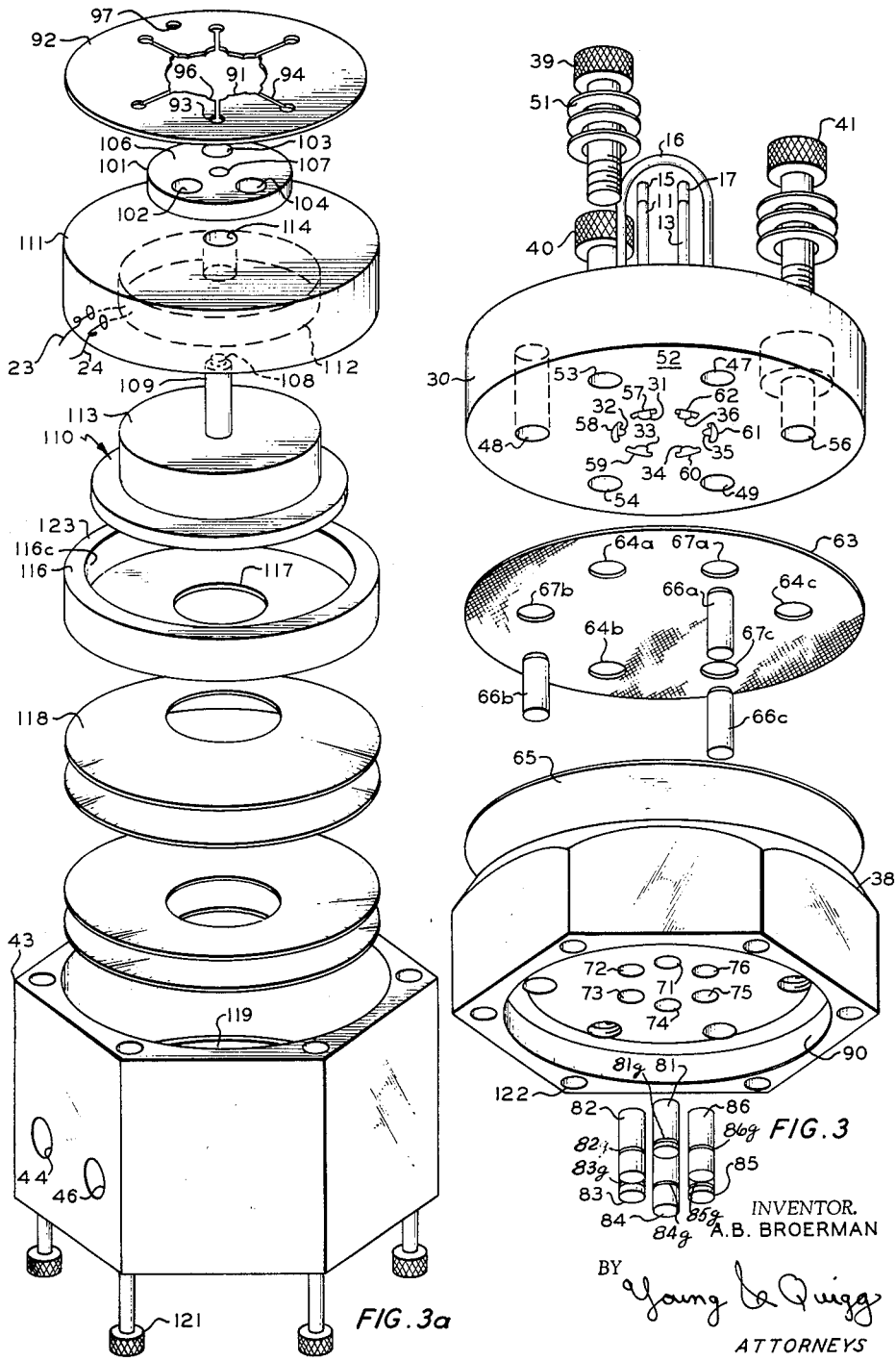

Referring now to FIGURE 3, showing a tilted backward exploded view of the upper portion of the sampling valve, a number of spring washers, such as 51, are disposed between each cap screw and the upper body 30. The shank of the cap screws 39, 40 and 41 pass through the lower face 52 via cylindrical passages 53, 54 and 56, respectively. Spaced passages 31 to 36 terminate in slots 57 to 62, which are flush with lower face 52.

Flexible sealing diaphragm 63 is of a diameter sufficient to completely cover slots 57 to 62. Diaphragm 63 is preferably composed of a thermosetting plastic which is chemically inert and heat resistant, such as Teflon (a polymer of tetrafluoroethylene). Openings 64a, 64b, and 64c are provided to accommodate the cap screws.

Disposed below diaphragm 63 is a cushion 65. Cushion 65 is suitably a 2 mil thick nylon cloth 100×100 count, to prevent the sealing diaphragm from cold flowing.

Dowel pins 66a, 66b, and 66c are provided for orienting upper body 30 and diaphragm 63 in the proper position relative to intermediate body 38. The pins pass through diaphragm openings 67a, 67b, and 67c into passages 47, 48, and 49 of upper body 30, respectively.

Intermediate body 38 is provided a set of vertical passages 71 to 76 centered about the axis thereof. A set of metal plungers 81 to 86 are located within passages 71 to 76, respectively, when valve 12 is assembled. These plungers can transmit a sealing pressure against the adjacent areas of diaphragm 63, as directed. It will be noted that three of the pistons 81, 83 and 85 are substantially shorter than the other three 82, 84 and 86. A recess 90 is provided in the lower face of body 38. All the plungers are further provided with peripheral grooves 81g to 86g, respectively, into which fit the inner lobes, such as 91, of spring 92 of FIGURE 3a. It will be noted that spring 92 has six holes, such as 93, and six slots, such as 94, which form the truncated pie-shaped leaves, or lobes 91, that seat into the grooves on the periphery of plungers 81 to 86. Hemispherically-shaped cutouts, such as 96, are provided at the inner ends of slots 94, while smaller diameter holes, such as 97, are located about the periphery for alignment purposes. These features give each of the lobes the necessary flexibility to flex with the great many cycles of operation of the plungers. Spring 92 is preferably made from tempered clock spring steel, 0.011 inch thickness.

Rocker washer 101 is disposed below spring 92. A set of vertical passages 102, 103 and 104 are provided therein. Longer plungers 82, 84 and 86 are slidably disposed within said passages, respectively, when the valve is assembled. Shorter plungers 81, 83 and 85 contact the upper face 106 of washer 101, being rocked up and down thereby. Center passage 107 is provided to accommodate the pilot 108 of shaft 109 of armature component 110.

Stator component 111 is provided with a recess 112 in its lower face to permit the stator to seat over the upper portion 113 of armature 110. Passage 114 is provided in floating stator 111 for shaft 109 of the armature. Leads 23 and 24 connect from a solenoid 125, see FIGURE 5, within the stator to the programmer of FIGURE 1.

Holder 116 provides a support into which armature 110 fits. The depth of cavity 116c allows shaft 109 to fall free of rocker washer 101, the latter resting on top of stator 111. However, washer 101 is still laterally immobilized by pilot 108 extending into washer passage 107. Opening 117 in support 116 is provided to permit a biasing screw (not shown) to be passed through the base of the valve to contact armature 110 and limits its downward travel, if desired. Spring washers 118 are grouped to give the desired amount of upward force to bias the longer plungers 82, 84 and 86 closed, when the solenoid is in the nonexcited position, by overcoming leaf spring 92. These washers may be stacked as shown, or in parallel, to achieve the desired force of member 116 against stator 111, and thereby against the lower ends of longer plungers 82, 84 and 86; to permit sealing of diaphragm 63 against face 52. Allen-headed cap screws, such as 121, are located on the lower periphery of body 43, and secure the same into threaded passages, such as 122, in the lower face of intermediate body 38. The upper annular surface 123 of member 116 contacts the edge of the under face of floating stator 111, exerting upward bias thereupon.

Figure 4:
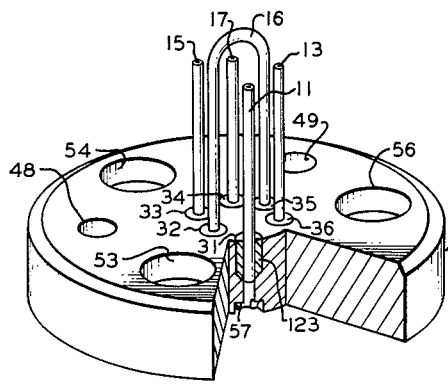
FIGURE 4 is a tilted downward view in partial section of the upper member of the valve of this invention.

In FIGURE 4 is shown a tilted downward view, in partial section, of upper body, or cap 30. Conduit 11 is press fitted into spaced passage 31, thereby effecting a seal. Silver brazing gives mechanical strength to the press fit to prevent twisting the conduit and breaking the seal. It will be noted how passage 31 is machined at its lower end to form horizontal slot 57 which is flush with the lower face of body 30.

Figure 5:
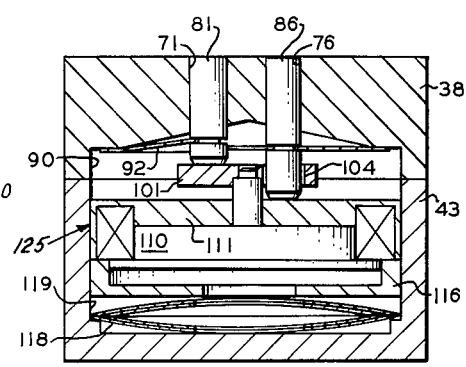
FIGURE 5 is an elevational view in full section of lower member of the sampling valve which has general utility as a double-acting, fast response, solenoid-actuated control mechanism.

In FIGURE 5 is shown an elevational view of the assembled solenoid-actuated assembly in full section, with all of the elements numbered as in FIGURES 3 and 3a, in the position resulting from the solenoid being energized.

In operation, when the solenoid is deenergized, spring 92 biases shorter plungers 81, 83 and 85, downward, while spring washers 118 bias casing 116 and stator 111 upward, raising longer plungers 82, 84 and 86 to pressure adjacent portions of sealing diaphragm 63 against lower face 52 of upper body 30. This seals off the slotted ends 57 and 58 of spaced passages 31 and 32, slot 59 from 60, and slot 61 from 62. Concurrently, because the shorter plungers are out of contact with the diaphragm, the slotted ends 57 and 62 of spaced passages 31 and 36, respectively, are in communication, also slots 58 and 59, and finally slots 60 and 61. The downward force exerted by spring 92 on shorter plungers 81, 83 and 85 depresses rocker washer 101 to move armature 110 toward the bottom of the recess in casing 116. An air gap thus exists between armature 110 and stator 111.

Thus, carrier gas flowing in conduit 11 enters sampling valve 12 via spaced passage 31, flows from slot 57 into the lower end thereof over to slot 62 of spaced passage 36, directly out of valve 12 via conduit 13 to column 14. Simultaneously, sample fluid flowing from conduit 15 enters valve 12 through spaced passage 33, flows from slot 59 in the lower face thereof to slot 58 of spaced passage 32, and out of valve 12 into external sample loop 16. Sample fluid in loop 16 reenters body 30 via spaced passage 35, flows from slot 61 in the lower end thereof over to slot 60 of spaced passage 34 and out of valve 12 via exhaust conduit 17 to discharge.

When programmer 22 energizes solenoid 125, the valve is switched to its alternate position of operation. Armature 110 moves upwardly through the air gap between the armature and stator 111. This moves shaft 109 upwardly to exert pressure thru washer 101 on the shorter bottom ends of plungers 81, 83 and 85, raising them to pressure adjacent portions of sealing diaphragm 63 against lower face 52. This seals off the slots 57 from 58, slot 59 from 60, and slot 61 from 62. At this moment, all the passages are sealed, interrupting all fluid flow thru the valve, thus achieving the desired "break before make" type of switching. The permitted movement of the armature has reduced the total magnetic gap by about one half. Under the influence of the magnetic flux, the floating stator 111 and casing 116 move downward on the armature shaft to close the gap, overcoming the upward bias of washers 118. With the stator no longer pressing upward, spring 92 moves longer plungers 82, 84 and 86, downward and out of contact with diaphragm 63. Thus, the slotted ends 57 and 58 of passages 31 and 32, respectively, are in communication, also slots 59 and 60, and slots 61 and 62.

Now, carrier gas in conduit 11 still enters sampling valve 12 via spaced passage 31, flows from slot 57 in the lower end thereof, over to slot 58 and spaced passage 32, and out of valve 12 into external sample loop 16, driving a sample slug previously trapped therein before it. Flowing carrier gas reenters body 30 via spaced passage 35, flows from slots 61 in the lower end thereof over to slot 62 of spaced passage 36, and out of valve 12 via conduit 13 to sorption column 14. Simultaneously, sample fluid from sample source conduit 15 still enters valve 12 through spaced passage 33, flows from slot 59 in the lower end thereof over to slot 60 of spaced passage 34 and directly out of valve 12 via exhaust conduit 17 to discharge.

When the programmer once more de-energizes solenoid 125, the valve is switched back to its first position of operation. Specifically, carrier gas is sent directly through valve 12 to conduit 13, while sample fluid is passed first through loop 16 and then is vented directly from the sample valve via conduit 17. The frequency with which sample slug is passed to the sorption column is determined by the frequency of excitation of the solenoid, controlled thru programmer 22.

Figure 6:
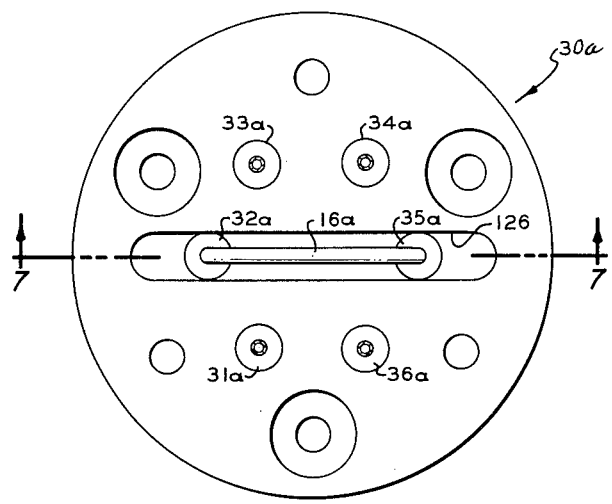
FIGURE 6 is a top plan view of the upper member of the valve showing a second embodiment of the invention.
Figure 7:
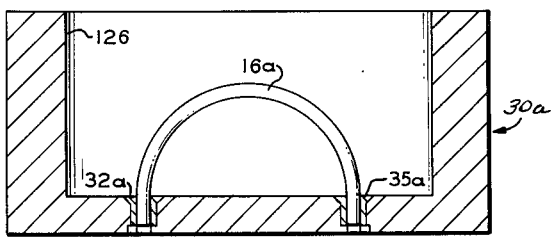
FIGURE 7 is an elevational view in full section taken along lines 7—7 in FIGURE 6.

Referring now to FIGURE 6, there is shown a top view of an alternate configuration of the upper block, or cap, designated 30a. All the other elements of sampling valve 12 are of identical structure and function, with the exception of the size and disposition of sample loop 16a, which has been reduced in volume and recessed in cap 30a. Block 30a has been modified to provide a void-free internal sample loop of a volume much smaller than obtainable with the configuration shown in FIGURE 2. Cap 30a is provided with a generally rectangular slot 126, which is alligned so as to overlay vertical passages 32a and 35a, as shown in FIGURE 7. Sample loop 16a is disposed in slot 126 and communicates between passages 32a and 35a. The ends of loop 16a are similarly press fitted and silver brazed into the vertical passages. By employing a tubing of 10 mil bore, it is possible to achieve a sample loop volume of about 0.5 microliter, which is preferable volume for liquid sampling of a process stream to be analyzed.

In operation, the second embodiment of valve 12, shown in FIGURES 6 and 7, performs identically to that of the first embodiment. The only distinction is that the sample flows through recessed sample loop 16a in the second embodiment, instead of through exposed sample loop 16 of the first embodiment. Thus, when programmer 22 switches the valve to its alternate position, a liquid sample slug of reduced volume passes from sampling valve 12 via conduit 13, usually to a vaporization zone (not shown), and from thence there to a sorption column, such as 14.

Various modifications and alterations of this invention will become apparent to those skilled in the art without departing from the scope and spirit of this invention and it should be understood that the latter is not necessarily limited to the aforementioned discussion.

I claim:

1. A double-acting solenoid-actuated control mechanism comprising, in combination: a casing having a chamber therein and first and second passages extending from said chamber to a region exterior of said casing; first and second control rods slidably disposed in said first and second passages, respectively, said first rod being shorter than said second rod; first spring means secured within said chamber and operatively attached to each of said rods so as to bias said rods inwardly of said casing; a washer disposed within said chamber to contact the inner end of said first rod, said washer being traversed by a third passage to permit said second rod to slidably pass therethrough; a floating stator positioned within said chamber; second spring means positioned within said chamber so as to bias said stator toward the inner end of said second rod; an armature positioned adjacent said stator, said armature engaging said washer so that the force exerted by said first spring means through said first rod and said washer biases said armature away from said stator to form an air gap therebetween; a solenoid positioned within said chamber so that when said solenoid is energized said armature is moved relative to said stator to close said air gap, whereby said first rod is moved in a direction outwardly of said casing and said second rod is moved in a direction inwardly of said casing.

2. A solenoid actuated valve system comprising, in combination: a body having two opposite faces and having first, second and third spaced passages therein, each of said passages communicating between the first of said faces and a separate point on the second face; a casing having a third face spaced from said second face of said body; a flexible sealing diaphragm disposed between said second and third faces; and said casing having a chamber therein and fourth and fifth passages extending from said chamber to respective first and second regions at said third face, said first region being located between said first and second passages and said second region being located between said second and third passages; first and second control rods slidably disposed in said fourth and fifth passages, respectively, said first rod being shorter than said second rod; first spring means secured within said chamber and operatively attached to each of said rods so as to bias said rods inwardly of said casing; a washer disposed within said chamber to contact the inner end of said first rod, said washer being traversed by a sixth passage to permit said second rod to slidably pass therethrough; a floating stator positioned within said chamber; second spring means positioned within said chamber so as to bias said stator toward the inner end of said second rod; an armature positioned adjacent said stator, said armature engaging said washer so that the force exerted by said first spring means through said first rod and said washer biases said armature away from said stator to form an air gap therebetween; a solenoid positioned within said chamber so that when said solenoid is energized said armature is moved relative to said stator to close said air gap, whereby said first rod is moved in a direction outwardly of said casing to block communication between said first and second passages and said second rod is moved in a direction inwardly of said casing to permit communication between said second and third passages.

3. The valve system of claim 2 wherein said body is provided with first, second and third flared recesses in said second face in communication with said first, second and third passages, respectively.

4. A solenoid actuated valve system comprising, in combination: a body having two opposite faces and having a plurality of spaced first pasages therein, each of said first passages communicating between the first of said faces and a separate point on the second face, said points being equally spaced from one another in a circular path on said second face; a casing having a third face spaced from said second face of said body; a flexible sealing diaphragm disposed between said second and third faces; said casing having a chamber therein and a plurality of second passages extending from said chamber to separate regions at said third face, each of said regions being located between adjacent points on said second face; a plurality of control rods, each of which is slidably disposed in a respective second passage, alternate ones of said control rods being shorter than the other control rods adjacent thereto; first spring means secured within said chamber and operatively attached to each of said rods so as to bias said rods inwardly of said casing; a washer disposed within said chamber to contact the inner ends of the shorter of said rods, said washer being traversed by third passages to permit the longer of said rods to slidably pass therethrough; a floating stator positioned within said chamber; second spring means positioned within said chamber so as to bias said stator toward the inner ends of the longer of said rods; an armature positioned adjacent said stator, said armature engaging said washer so that the force exerted by said first spring means through the shorter of said rods and said washer bias said armature away from said stator to form an air gap therebetween; a solenoid positioned within said chamber so that when said solenoid is energized said armature is moved relative to said stator to close said air gap, whereby the shorter of said rods are moved in a direction outwardly of said casing to force said diaphragm into engagement with said second face to block communication between alternate ones of said first passages and the longer of said rods are moved in a direction inwardly of said casing to permit said diaphragm to move away from said second face.

References Cited by the Examiner

UNITED STATES PATENTS

| | | | |
|---|---|---|---|
| 2,619,986 | 12/52 | Goepfrich | 251—129 |
| 3,019,815 | 2/62 | Lenardon et al. | 251—331 X |
| 3,021,713 | 2/62 | Wright | 73—422 |

RICHARD C. QUEISSER, *Primary Examiner.*